United States Patent

Siklos

[15] 3,665,382
[45] May 23, 1972

[54] VEHICLE DETECTION APPARATUS

[72] Inventor: Gregory Siklos, Bronx, N.Y.

[73] Assignee: The Marbelite Company, Inc., Brooklyn, N.Y.

[22] Filed: Oct. 30, 1969

[21] Appl. No.: 872,487

[52] U.S. Cl............................................................340/38 L
[51] Int. Cl. ..........................................................G08g 1/01
[58] Field of Search..............................340/38 L, 38 R, 31 A

[56] References Cited

UNITED STATES PATENTS

| | | | |
|---|---|---|---|
| 3,178,685 | 4/1965 | Pettitt.................................... | 340/38 L |
| 3,312,935 | 4/1967 | Brothman et al...................... | 340/38 L |
| 3,375,493 | 3/1968 | Gottlieb................................. | 340/38 L |
| 3,451,041 | 6/1969 | Marosi et al........................... | 340/38 L |
| 3,492,637 | 1/1970 | Switzer.................................. | 340/38 L |

Primary Examiner—Kathleen H. Claffy
Assistant Examiner—Randall P. Myers
Attorney—Wolf, Greenfield & Sacks

[57] ABSTRACT

A vehicle detection oscillating circuit includes an inductive sensing loop imbedded in a road, or highway. The output signal amplitude of the oscillating circuit fluctuates when a vehicle is near the sensing loop. A differential amplifier has one input coupled without, and a second with a delay circuit to the output of the oscillator circuit. The differential amplifier is coupled to a relay which is normally energized and becomes de-energized upon the detection of a vehicle near the sensing loop.

15 Claims, 2 Drawing Figures

VEHICLE DETECTION APPARATUS

BACKGROUND OF INVENTION

The present invention relates to an improved apparatus for detecting the presence of stationary or moving vehicles on or along a road or highway. In particular, the invention is directed to an improved detector circuit that includes a sub-surface sensing loop.

It is an object of the present invention to provide an improved vehicle detection system.

It is another object of the present invention to provide a vehicle detection circuit where essentially no circuit adjustment is necessary regardless of environmental placement.

It is still another object of the present invention to provide a vehicle detection circuit that is exceptionally sensitive to vehicle presence.

SUMMARY OF THE INVENTION

According to the invention, a vehicle detection circuit includes an inductive loop, which may be imbedded within the road or highway in a preselected location, comprising an input oscillator circuit whose output signal amplitude is indicative of the presence or absence of a vehicle and a difference sensing circuit having first and second inputs coupled to the output of the oscillator circuit with different delays. An output circuit means is coupled to the output of the difference circuit and assumes first and second states in response to the presence and absence respectively of a vehicle near the loop.

BRIEF DESCRIPTION OF DRAWINGS

The foregoing objects and advantages will become more apparent when considered in conjunction with the accompanying drawings in which.

DETAILED DESCRIPTION OF PREFERRED EMBODIMENTS

Figure 1:
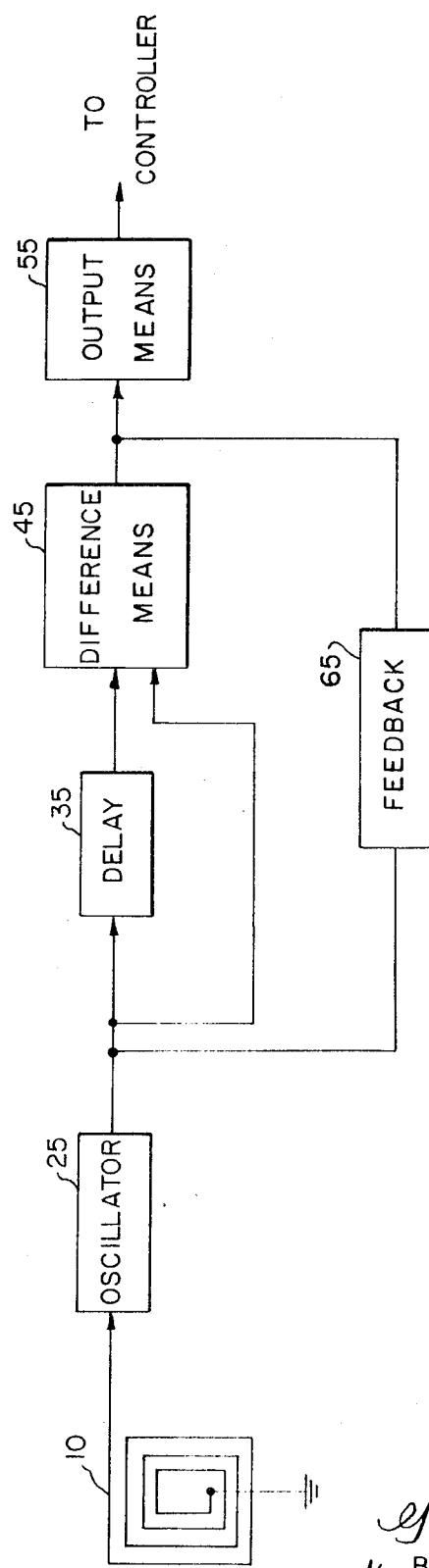
FIG. 1 is a block diagram of the vehicle detection system of the present invention.

FIG. 1 is a block diagram representation of the vehicle detection system. Sensing loop 10 connects to the input of oscillator 25. The oscillator is adapted to operate at a particular frequency and output amplitude when no vehicle is near loop 10 that changes when a vehicle is near loop 10. The output of oscillator 25 couples to hold (delay) means 35 and to one input of difference circuit means 45. The output from delay means 35 connects to the other input of difference circuit means 45.

In operation, when a vehicle enters loop 10, the output of oscillator 25 changes. Means 35 delays this change to one input of means 45, thereby enabling difference circuit means 45 to sense the change of amplitude of oscillator 25. One output from difference means 45 couples to output circuit 55, which detects the presence of a vehicle and outputs an indication to utilization circuitry (not shown). Feedback sensitivity circuit 65 couples between difference means 45 and delay means 35 and is adapted to cause the difference circuit means 45 to operate at a sensitive quiescent value.

The vehicle detector of the present invention is adapted to furnish vehicle traffic information in the form of presence data that can be inputed to vehicle-actuated traffic signal controllers, traffic counters, computers or similar devices. With the use of such data, information concerning the traffic flow along a roadway or at an intersection can be obtained. Also, such parameters as traffic volume, lane traffic speed, and lane traffic concentration can be obtained from the presence data; and from that, rate of change, as well as hourly, daily and monthly variations thereof may be compiled.

Figure 2:
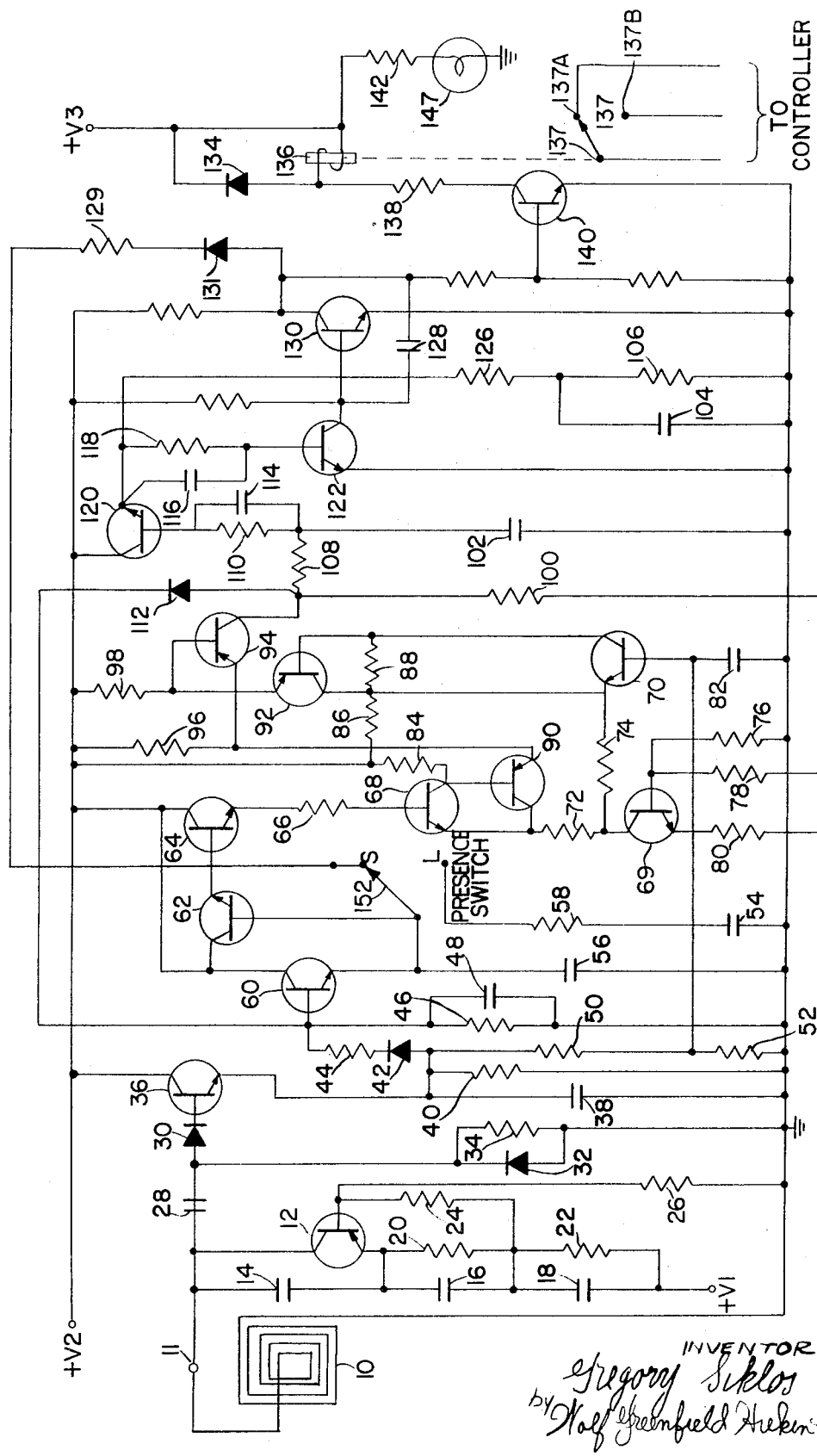
FIG. 2 is a schematic diagram of one circuit embodiment of the present invention.

In both FIGS. 1 and 2, there is shown inductive loop 10. This loop, which functionally forms part of the oscillator circuit of the input circuit means, is imbedded in the street pavement immediately below the surface in the lane or lanes where the measurement is to be taken. Some loss of sensitivity may occur when the loop is installed near metal such as reinforcing rods and welding wire mesh. The loop, therefore, is preferably placed near to the surface so as to be clear from all such buried metal.

Each detection circuit may be coupled to one or more loops, and each loop in turn may be of a different size. For traffic signal control, a three-turn 5 foot × 8 foot loop with the 8 foot side at a right angle to the traffic direction is commonly used. When several loops are to be connected to the same unit, they may be wired in parallel or series. Generally speaking, the connection between the inductive loop and the detection circuit itself may be as long as 750 feet and comprise a two-wire twisted pair. For one use, the wire pair was of the 14 gauge size and had two twists per foot. If the two-wire pair is installed in the same conduit that houses signal cables, it may be desirable to shield the pair in a properly grounded shielding conductor.

The circuit of the present invention, as exemplified in detail in FIG. 2, is also provided with switch means (switch 152) enabling operation in either the short presence mode or the long presence mode. Depending on the particular location and contemplated use of the detector circuit, the switch remains in one of the two states. If the detector circuit is employed to count vehicles, then the short presence mode is desirable so that the circuit can recover rapidly enough to respond to subsequent vehicles. For traffic signal control, however, the long presence mode might be more desirable. Thus, the detector circuit generates a relatively short signal when the presence switch is in the short mode and a vehicle enters, and generates a relatively long signal when the presence switch is in the long mode and a vehicle enters and stops.

Referring to FIG. 2, the loop 10 is connected by way of terminals 11 and 13 to the input of the vehicle detection circuit. The input circuitry includes transistor 12, a group of biasing resistors 20, 22, 24 and 26 and a group of series connected capacitors 14, 16 and 18. This combination in conjunction with loop 10 functions as an oscillator circuit.

In normal operation with no vehicle present over loop 10, the circuit including transistor 12 oscillates at a frequency dependent upon the value of the inductive loop 10, the capacitors 14, 16 and 18, and other circuit parameters. Coupling capacitor 28 couples this oscillatory signal by way of diode 30 to the base of transistor 36. Diode 32 clips the negative going portion of the signal at essentially ground potential so that transistor 36 is sensing primarily positive signals.

During non-presence operation, transistor 36 is conducting and its emitter is effectively at a DC potential of, for example, +12 volts. Should a vehicle approach loop 10, the effective inductance of the loop changes. This causes a change in the frequency and output amplitude of the oscillator. The voltage at the collector of transistor 12 decreases and, in turn, causes a decrease in the voltage at the emitter of transistor 36.

Capacitor 38, coupled between the emitter of transistor 36 and ground, in effect senses the absence or presence of a vehicle near loop 10. Resistor 40 couples across capacitor 38, while diode 42 has its anode coupled to the emitter of transistor 36 and its cathode coupled by way of resistor 44 to the base of transistor 60. The anode of diode 42 also couples by way of resistor 50 and resistor 52 to ground. The base of transistor 60 also couples, by way of the parallel combination of capacitor 48 and resistor 46, to ground. The collector of transistor 60 couples to a Darlington pair, including transistors 62 and 64, as shown. The emitter of transistor 60 couples by way of capacitor 56 to ground.

In the short presence mode of operation, resistor 58 and capacitor 54 are not connected into the circuit. However, for the long presence mode of operation, which is selected by switch 152, these two components are connected to the emitter of transistor 60, thereby changing the time constant of that portion of the circuit and providing a longer delay time.

The transistors 60, 62 and resistor 64 comprise the delay means, which essentially couples between the emitter of transistor 36 and the base of transistor 68. The base of transistor 68 forms one input of a difference means shown as a differential amplifier, the other input of which is at the base of transistor 70. A signal at the emitter of transistor 36 is coupled by way of resistor 50 to this input of the differential amplifier. The differential amplifier also includes transistors 69, 90, 92 and 94. Transistor 69 along with its associated resistors 76, 78 and 80 provides a current source drive for transistors 68 and 70. Transistor 69 is biased by its associated resistors to supply a relatively constant current for transistors 68 and 70.

The resistors 84, 86 and 88 are coupled between the collectors of transistors 68 and 70, while lead 91 is connected from resistor 84 to the positive power supply +V2. This connection and the values of the resistors 84, 86 and 88 provide for an initial imbalance in the differential amplifier, thereby causing transistor 70 to then conduct more than transistor 68. Transistor 90 has its base coupled from the collector of transistor 68, its collector coupled from the emitter of transistor 68, and has its emitter connected by way of resistor 96 to positive voltage supply +V2. Similarly, transistor 92 has its base coupled to the collector of transistor 70, its collector coupled from the emitter of transistor 70, and its emitter coupled by way of resistor 98 to positive power supply +V2. Transistor 94 has its emitter coupled to the emitter of transistor 90, its base coupled to the emitter of transistor 92, and its collector coupled by way of resistor 100 to negative voltage supply −V1. Diode 112 also connects to the collector of transistor 94 and to the base of transistor 60. Diode 112 comprises the feedback sensitivity means and provides a feedback path to the base of transistor 60, enabling the differential amplifier to operate at a sensitive quiescent value.

As previously stated, when the detector circuit is initially activated, the placement and values of the resistors 84, 86 and 88 of the differential amplifier causes transistor 70 to initially conduct more than transistor 68. This, in turn, renders transistors 92 and 94 conductive. The feedback provided by diode 112 causes a current feedback to the base of transistor 60, which aides in charging capacitor 56. This action is coupled by way of transistors 62 and 64 and causes an increase in the voltage at the base of transistor 68. When the differential amplifier reaches a balanced condition, the base-emitter voltage of transistor 94 is beyond cutoff, so transistor 94 ceases conducting. The collector of transistor 94 then goes negative and diode 112 becomes back-biased, thereby interrupting feedback current to the base of transistor 60. As long as no vehicle enters, this action is repetitive and the conduction of transistor 94 cyclically changes, thereby keeping the differential amplifier operating at its most sensitive level.

After the detection circuit is initially turned on and no vehicle has yet entered loop 10, the oscillator circuit is oscillating at a predetermined frequency. The remainder of the circuitry between the oscillator portion and the differential amplifier is in a balanced condition whereby the inputs to the bases of transistors 68 and 70 are at substantially the same value. Transistors 90 and 92 are conducting, the collector of transistor 94 is at a positive voltage, and intermittent conduction occurs through diode 112.

When a vehicle approaches loop 10, the frequency and amplitude of the oscillator output signal changes. This decreased amplitude is reflected by way of the emitter of transistor 36 to the base of transistor 70. The voltage change is delayed by the capacitor 56, (and capacitor 54 when in the long presence mode) and the transistors 60, 62 and 64 so that no voltage change occurs at the base of transistor 68 immediately. A voltage change is reflected at the base of transistor 70 immediately, however, and this decreased voltage tends to turn off transistor 92, which in turn reverse-biases the base-to-emitter junction of transistor 94, turning it off rapidly. This is a regenerative action that is aided by the increased conduction of transistor 68 caused by the constant current generated from transistor 69. The voltage at the collector of transistor 94 goes negative at that time, and the feedback current is interrupted because diode 112 is reverse-biased.

The output circuitry includes transistors 120, 122, 130 and 140 and associated resistors and capacitors. This circuitry, in the embodiment of FIG. 2, senses the voltage output change of the differential amplifier, particularly at the collector of transistor 94 and converts this into a higher power signal sufficient to actuate relay 136. Relay 136 connects from the collector of transistor 140 by way of resistor 138 to the positive power supply +V3. The relay contacts 137A, B and C are shown in an energized state (non-presence state) with contact 137C as a common contact, 137A a normally open contact and 137B a normally closed contact.

When no vehicle is present, as previously stated, transistor 94 is conducting and its collector is positive, thereby holding transistor 120 on. This action, in turn, holds transistor 122 on, transistor 130 off, and transistor 140 on, thereby keeping relay 136 in its energized state. When a vehicle appears near loop 10, the differential amplifier senses this; and transistor 94 cuts off. Its collector voltage therefore decreases, and transistor 120 subsequently turns off. This action, in turn, turns transistor 122 off, transistor 130 on, and transistor 140 off, thereby de-energizing relay 136, closing contact 137B, and indicating to the traffic controller that a vehicle is present within loop 10.

Other components of the output circuitry include the pilot lamp 147, which ignites when a vehicle enters loop 10, and a feedback path including resistor 129 and diode 131, which connects from transistor 130 to presence switch 152. This feedback path is operative when a vehicle has entered during the short presence mode to short-circuit capacitor 56 and cause the differential amplifier to quickly resume a balanced condition. In effect, this feedback controls the time that the relay is de-energized and tends to shorten the de-energization period.

An important feature of the invention is its sensitivity to vehicles. The inclusion of a hold circuit, a difference sensing circuit, and a sensitivity feedback means arranged to cause the difference circuit to operate at its most sensitive region help achieve this sensitivity.

A further feature of the invention is the use of a relay that is normally energized when no vehicle is detected. With this arrangement, if a power fault shorted or open circuited loop or other error condition occurs, the relay de-energizes until the condition is corrected, thereby indicating to the controller, after a predetermined time, that a fault has occurred. With the use of a normally de-energized relay, no such fault signal occurs, as the relay may never become energized.

Certain portions of FIG. 2, not essential to an understanding of the invention are not described in detail so as to avoid obscuring the principles of the invention. Those skilled in the art will be able to construct an embodiment of the invention by interconnecting the components with the designated parameter values shown in the schematic circuit diagram.

Numerous modifications and uses of and departures from the specific embodiments described will now become apparent to those skilled in the art without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A vehicle detection circuit for use with a subsurface inductive loop comprising;
    input circuit means having an input terminal and an output terminal and capable of oscillating when its input terminal is coupled to the inductive loop,
    said input circuit means being adapted to provide first and second output signal amplitudes in response to the absence and presence respectively of a vehicle near said loop,
    a difference sensing means having first and second input terminals and an output terminal, the first input terminal of said difference sensing means being coupled to said output terminal of said input circuit means, a delay means coupled between the output terminal of said input circuit means and the second input terminal of said difference sensing means, said difference sensing means assuming first and second states in response to said input circuit means assuming said first and second output signal amplitudes respectively, said delay means being for delaying the occurrence of the amplitude change from the output terminal of said input circuit means to the second input terminal of said difference sensing means, output circuit means having an input terminal coupled to said output terminal of said difference sensing means, said output circuit means including signal means for sensing when said difference sensing means has changed state, and feedback means coupled from the output of said difference sensing means to said delay means for establishing said difference sensing means near its first state in the absence of said vehicle, wherein said difference sensing means includes a differential amplifier having a pair of transistors biased with their bases coupled to the respective inputs of said difference sensing means and their emitters coupled to a common point, wherein said difference sensing means further includes a sensing transistor having its emitter and base coupled to the respective collectors of said transistor pair, and means for biasing said sensing transistor so that it changes conduction states when said differential amplifier becomes unbalanced.

2. A vehicle detection circuit for use with a subsurface inductive loop comprising;

input circuit means having an input terminal and an output terminal and capable of oscillating when its input terminal is coupled to the inductive loop, said input circuit means being adapted to provide first and second output signal amplitudes in response to the absence and presence respectively of a vehicle near said loop, a difference sensing means having first and second input terminals and an output terminal, the first input terminal of said difference sensing means being coupled to said output terminal of said input circuit means, a delay means coupled between the output terminal of said input circuit means and the second input terminal of said difference sensing means, said difference sensing means assuming first and second states in response to said input circuit means assuming said first and second output signal amplitudes, respectively, said delay means being for delaying the occurrence of the amplitude change from the output terminal of said input circuit means to the second input terminal of said difference sensing means, output circuit means having an input terminal coupled to said output terminal of said difference sensing means, said output circuit means including signal means for sensing when said difference sensing means has changed state, first feedback means coupled from the output of said different sensing means to said delay means for establishing said different sensing means near its first state in the absence of said vehicle, and a second feedback means, coupled from an output of said output circuit means to said presence switch, and operable when said presence switch is in the short presence mode and a vehicle is near said loop to cause said delay time to decrease.

3. A vehicle detection circuit as defined in claim 2 wherein said input circuit means includes a rectifying means for clipping one polarity of the oscillator output signal.

4. A vehicle detection circuit as defined in claim 2 wherein said delay means includes an R-C time constant delay circuit and a plurality of transistors connected in a relatively high impedance configuration.

5. A vehicle detection circuit as defined in claim 2 wherein said output circuit means includes a relay that is in an energized condition when a vehicle is absent from the vicinity of said loop.

6. A vehicle detection circuit as defined in claim 2 and further including a presence switch coupled to said delay means for selectively changing the delay time thereof.

7. A vehicle detection circuit as defined in claim 2 wherein said feedback means includes a diode which is periodically forward and reverse biased.

8. A vehicle detection circuit as defined in claim 2 wherein said first feedback means operates cyclically to establish the first state.

9. A vehicle detection circuit as defined in claim 2 wherein said difference sensing means includes a differential amplifier having a pair of transistors biased with their bases coupled to the respective inputs of said difference sensing means and their emitters coupled to a common point.

10. A vehicle detection circuit as defined in claim 9 wherein said difference sensing means further includes a sensing transistor having its emitter and base coupled to the respective collectors of said transistor pair.

11. A vehicle detection circuit as defined in claim 10 and including means for biasing said sensing transistor so that it changes conduction state when said differential amplifier becomes unbalanced.

12. A vehicle detection circuit for use with a subsurface inductive loop comprising:

input circuit means having an input terminal and an output terminal and capable of oscillating when its input terminal is coupled to the inductive loop, said input circuit means being adapted to provide first and second output signal amplitudes in response to the absence and presence respectively of a vehicle near said loop, a difference sensing means having first and second input terminals and an output terminal, the first input terminal of said difference sensing means being coupled to said output terminal of said input circuit means, a delay means coupled between the output terminal of said input circuit means and the second input terminal of said difference sensing means, said difference sensing means assuming first and second states in response to said input circuit means assuming said first and second output signal amplitudes, respectively, said delay means being for delaying the occurrence of the amplitude change from the output terminal of said input circuit means to the second input terminal of said difference sensing means, output circuit means having an input terminal coupled to said output terminal of said difference sensing means, said output circuit means including signal means for sensing when said difference sensing means has changed state, a presence switch setable in either the short presence or the long presence mode coupled to said delay means for selectively changing the delay time thereof, and feedback means coupled from the output of said output circuit means to said presence switch, and operable when said presence switch is in the short presence mode and a vehicle is near said loop to cause said delay time to decrease.

13. A vehicle detection circuit as defined in claim 12 wherein said delay means includes at least one transistor, means for biasing the transistor, and storage means coupled to a terminal of the transistor.

14. A vehicle detection circuit as defined in claim 13 wherein said storage means includes a first capacitor having the moveable contact of the presence switch connected thereto for permitting a rapid discharge of the capacitor when the presence switch is in the short presence position and a vehicle is near the loop.

15. A vehicle detection circuit as defined in claim 14 comprising a second capacitor that is connected in parallel with the first capacitor when the presence switch is in its long presence position.

* * * * *